United States Patent [19]

Duran et al.

[11] Patent Number: 4,865,500
[45] Date of Patent: Sep. 12, 1989

[54] QUICK ACTION FASTENER ASSEMBLY

[75] Inventors: John A. Duran, Glendora; Robert Young, Burbank; Peter Chang, North Hollywood, all of Calif.

[73] Assignee: Avibank Mfg., Inc., Burbank, Calif.

[21] Appl. No.: 196,900

[22] Filed: May 17, 1988

Related U.S. Application Data

[63] Continuation of Ser. No. 927,320, Nov. 4, 1986, abandoned.

[51] Int. Cl.$^4$ .................. F16B 37/04; F16B 21/18
[52] U.S. Cl. ................................ 411/103; 411/353; 411/999
[58] Field of Search .............. 411/103, 105, 107, 111, 411/112, 352, 353, 937.1, 999

[56] References Cited

U.S. PATENT DOCUMENTS

| | | | |
|---|---|---|---|
| 2,949,143 | 8/1960 | Shur | 411/353 |
| 2,991,816 | 7/1961 | Harbison et al. | |
| 3,995,675 | 12/1976 | Cosenza | 411/999 |
| 4,069,855 | 1/1978 | Petroshanoff | 411/999 |
| 4,464,090 | 8/1984 | Duran | 411/353 |

*Primary Examiner*—Neill R. Wilson
*Attorney, Agent, or Firm*—Poms, Smith, Lande & Rose

[57] ABSTRACT

A fastener assembly for joining a panel to a sub-panel comprising a receptacle assembly having a threaded stud secured to the undersurface of the sub-panel. The assembly includes a bolt having an enlarged head at one end and a nose at the other end. The panel has a countersunk opening aligned with an opening in the sub-panel. The bolt is threaded for threaded engagement to the stud. The body of the bolt includes a plurality of spaced grooves extending longitudinally along the outer surface of the bolt body. A retainer surrounds the bolt body having spaced ears riding in the grooves and a stop ring in a groove adjacent the nose of the bolt stops the downward movement of the retainer.

In this manner, the bolt may be disposed in the countersunk opening in the panel with the retainer on the blind side of the panel and the stop ring preventing movement of the retainer off of the bolt body thus retaining the bolt to the panel. The bolt can remain in the up or extracted portion while the panel is being attached to the installation. A plate is provided on the underside of the panel trapping the retainer between the plate and the panel. The stop ring prevents downward movement of the bolt when in a hold out position with respect to the panel and restraining meaning on the bolt prevents inward movement of the bolt when in the hold out position with respect to the panel.

14 Claims, 5 Drawing Sheets

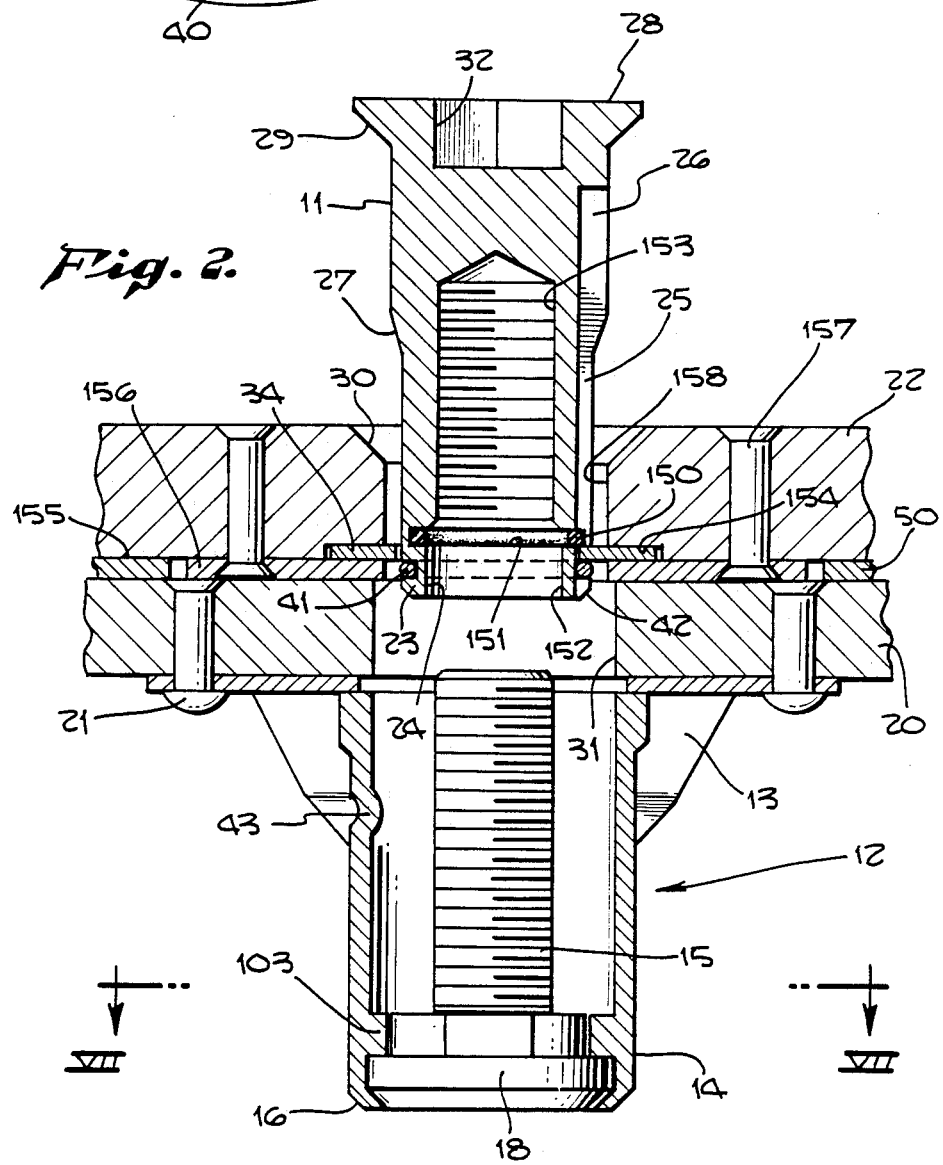

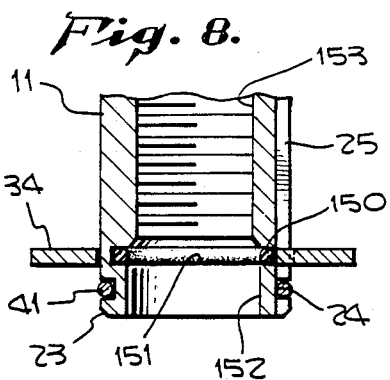
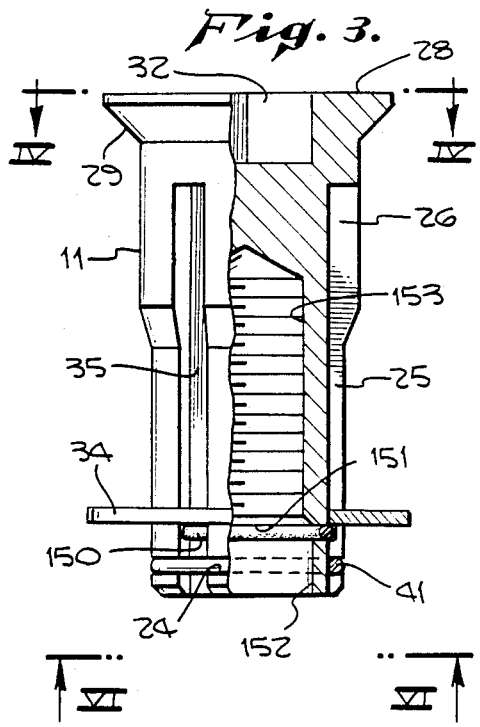
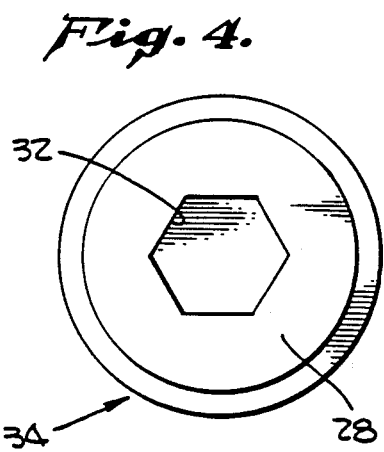
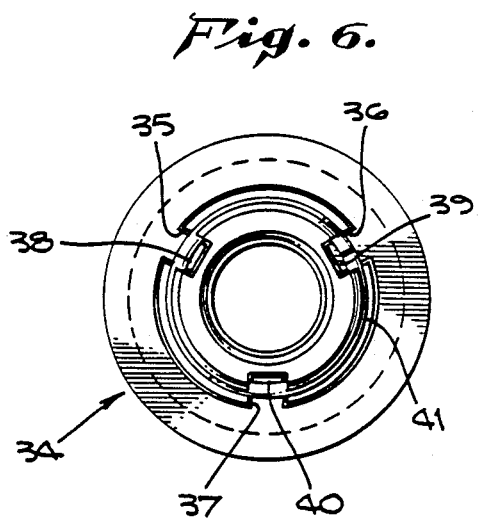
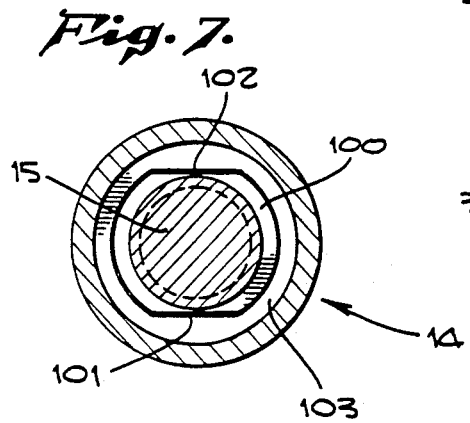

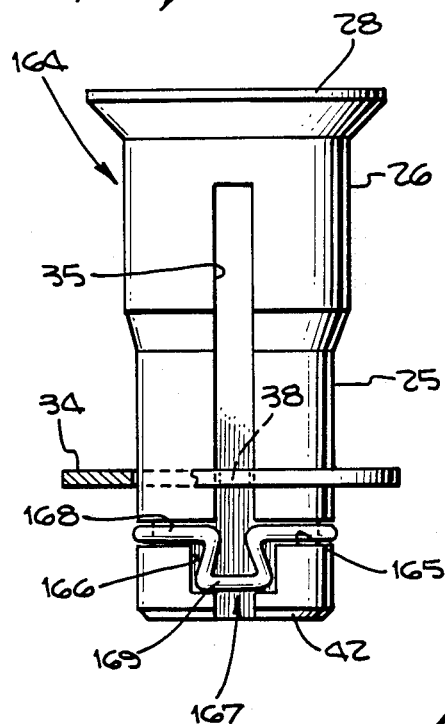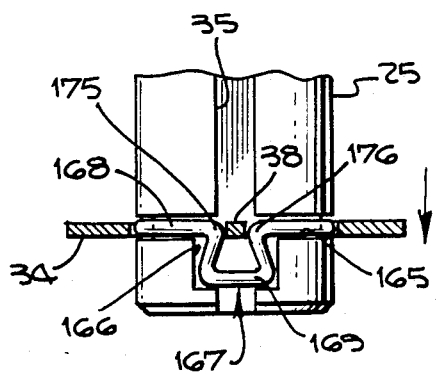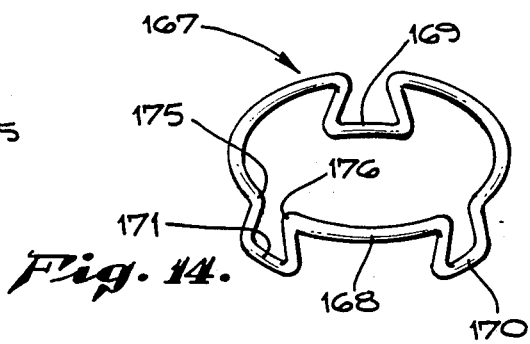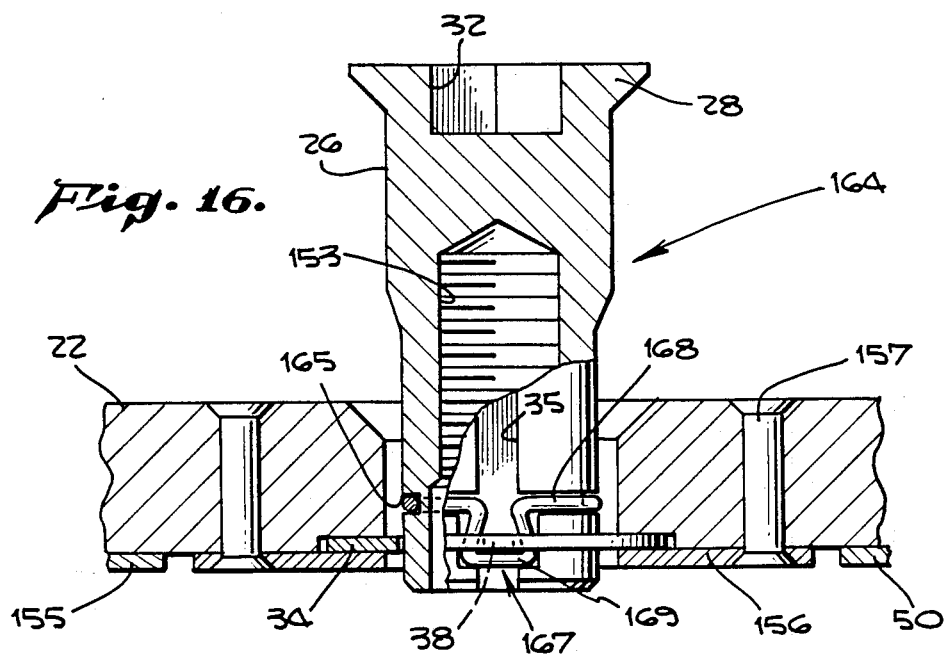

QUICK ACTION FASTENER ASSEMBLY

This is a continuation of co-pending application Ser. No. 06/927,320 filed on Nov. 4, 1986, now abandoned.

BACKGROUND OF THE INVENTION

1. Field of the Invention

The invention relates to quick action fasteners; and, more particularly, to improved quick action fasteners for panels of aircraft or the like.

2. Description of the Prior Art

Quick action fasteners are well known in the art. One such fastener is described in U.S. Pat. No. 2,991,816 to Harbison et al. These fasteners comprise a bolt body of stepped diameters and are used in aircraft panels having holes of certain diameters. These fasteners can be shifted in the panel holes, due to their stepped diameters, to compensate for slight misalignment of the holes in an abutting panel and sub-panel.

These prior art fasteners consist of a bolt having a retaining spring adapted to retain the bolt to a panel. The bolt is adapted to be threaded to a receptacle assembly mounted to a sub-panel. When torque is applied to the bolt, it is threaded to a stud in the receptacle assembly which draws the sub-panel to the panel and locks them together. When it is desired to unlock the panel from the sub-panel, the bolt is unscrewed from engagement with the stud and will be retained to the panel when free of the stud.

The retaining spring for the foregoing prior art bolt assembly fits into a countersunk hole in the sub-panel. These springs must expand and contract about the varying diameter sections of the bolt body. This can result in wear of the springs and fatigue of the same whereby they may come off the bolt body and be sucked into the aircraft engine causing damage to the aircraft. Of course, once the spring is free of the bolt body, the bolt can vibrate out of the panel hole and also be lost and sucked into the aircraft engine. In my copending application Ser. No., John A. Duran, inventor, and commonly assigned, I describe a panel fastener that can be used in preexisting aircraft panel and sub-panel holes while providing for some misalignment of the holes without danger of loss of components of the fastener assembly. The fastener assembly has a retainer retaining the bolt of the fastener assembly, which bolt has a shank of varying diameters, to a panel wherein the retainer does not have to expand and contract as it passes over the varying diameters of the bolt body. There are instances where it is desired to have the bolt of the panel fastener remain in the up or extracted position and hold it there while the panel is being attached to the installation, such as an aircraft. There is need for such panel fastener which retains the bolt in the extracted position.

SUMMARY OF THE INVENTION

It is an object of this invention to provide an improved quick action fastener assembly having a retainer retaining a bolt with a shank of varying diameters to a panel without expansion and contraction of the retainer as it passes over the shank of the body of the bolt and which allows the retainer to be trapped to the panel and holds the bolt in an up or extracted position.

These and other objects are preferably accomplished by providing a fastener assembly comprising a receptacle assembly having a threaded stud secured to the under-surface of the sub-panel. The assembly includes a bolt having an enlarged head at one end and a nose at the other end. The panel has a countersunk opening aligned with an opening in the sub-panel.

The body is threaded for threaded engagement to the stud. The body of the bolt includes a plurality of spaced grooves extending longitudinally along the outer surface of the bolt body. A retainer surrounds the bolt body having spaced ears riding in the grooves and a stop ring in a groove adjacent the nose of the bolt stops the downward movement of the retainer. A plate is provided on the underside of the panel trapping the retainer between the plate and the panel. The stop ring prevents downward movement of the bolt when in a holdout position with respect to the panel and restraining means on the bolt prevents inward movement of the bolt when in the hold out position with respect to the panel. In one embodiment, the stop ring and restraining member may be a single element. In this manner, the bolt may be disposed in the countersunk opening in the panel with the retainer on the blind side of the panel and the stop ring preventing movement of the retainer off of the bolt body thus retaining the bolt to the panel. The bolt can remain in the up or extracted position while the panel is being attached to the installation.

BRIEF DESCRIPTION OF THE DRAWING

FIG. 2 is a vertical sectional view of the fastener assembly of FIG. 1 installed in a panel and abutting sub-panel;

FIG. 3 is a vertical view partly in section of the bolt of FIG. 1 with the resilient ring, retainer and stop ring mounted thereto;

FIG. 4 is a view taken along lines IV—IV of FIG. 3;

FIG. 5 is a perspective view of one element of the fastener assembly of FIGS. 1 to 4;

FIG. 6 is a view taken along liens VI—VI of FIG. 3;

FIG. 7 is a view taken along lines VII—VII of FIG. 2;

FIG. 8 is a partial view similar to FIG. 3 showing another step in the functioning thereof;

FIG. 13 is a vertical view of another modification of the bolt and retainer of FIGS. 1 to 8; and FIG. 14 is a perspective view of one element of the apparatus of FIG. 13; and FIGS. 15 and 16 are views similar to FIGS. 11 and 12, respectively, illustrating two steps in the functioning of the apparatus of FIG. 13.

DESCRIPTION OF THE PREFERRED EMBODIMENT

Figure 1:
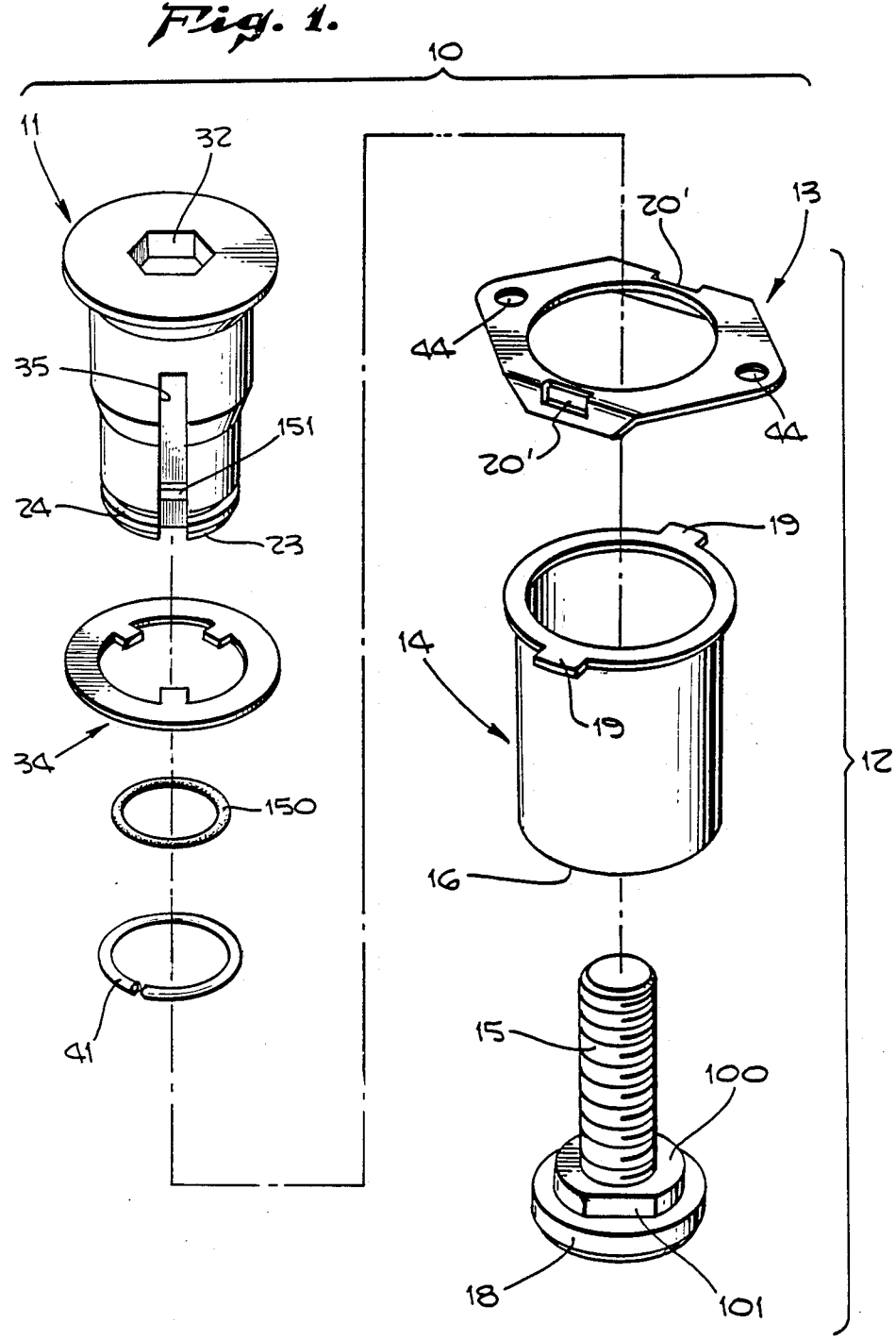
FIG. 1 is an exploded view of a fastener assembly in accordance with the teachings of the invention.

Referring now to FIG. 1 of the drawing, there is shown a fastener assembly 10 comprising a bolt 11 adapted to mate with a receptacle assembly 12. Receptacle assembly 12 is comprised of a receptacle bracket or basket 13, a barrel 14 and an externally threaded stud 15. As seen in FIG. 2, the lower end 16 of barrel 14 is crimped about the base 18 of stud 15 to engage the stud 15 and connect the barrel 14 thereto. As seen in FIG. 1, the stud 15 has a boss 100 with flattened areas 101, 102

(see also FIG. 7). As seen in FIG. 2, barrel 14 has an inwardly extending peripheral wall 103 configured similarly to boss 100 (FIG. 7). This is an anti-rotation feature preventing stud 15 from rotating within barrel 14 thereby allowing the stud 15 and barrel 14 to mate and lock and act as one unitary element. Barrel 14 also includes tabs 19 which are inserted in a pair of slots 20, formed in basket 13, thereby connecting the barrel 14 to basket 13. Slots 20 are circumferentially greater in length than the width of tabs 19 thereby permitting the barrel 14 and stud 15 to rotate to a limited degree with respect to basket 13. Basket 13 is secured to substructure 20 (FIG. 2) by any suitable means, such as rivets 21. Although receptacle assembly 12 and basket 13 have been described as an assembly of individual components, obviously a single element may be used.

Bolt 11 is shown in FIG. 2 in its disengaged and withdrawn position with respect to panel 22.

Bolt 11 includes a blunt nose 23, an annular groove 24 adjacent nose 23 and a generally cylindrical lower shank portion 25 (FIG. 2). Bolt 11 also includes an upper generally cylindrical shank portion 26 of an outer diameter substantially greater than the outer diameter of lower shank portion 25. A tapered portion 27 provides transition from upper shank portion 26 to lower shank portion 25. Bolt 11 has an enlarged head 28 at the upper end of shank portion 26 which head 28 is tapered at tapered portion 29 on its undersurface leading to shank portion 26. Head 28 is adapted to abut or bear against a countersunk opening 30 (FIG. 2) in panel 22 when threaded to stud 15 as will be discussed. Countersunk opening 30 in panel 22 is aligned with an opening 31 through sub-panel 20 as shown in FIG. 2. A hex socket 32 (see also FIG. 4) may be provided in head 28 as is well known in the art for receiving a suitable wrench therein. The interior surface 152 (FIG. 2) of bolt 11 is threaded, at threaded portion 153.

As seen in FIGS. 1 and 6, bolt 11 includes a plurality, such as three, of longitudinally extending slots or grooves 35 to 37 extending along the exterior thereof longitudinally and generally parallel to the longitudinal axis of bolt 11. These grooves 35 to 37 are preferably generally rectangular in cross section and may be of a depth at least substantially equal to the inward extent of the three ears 38 to 40 on a flat annular washer or ring 34 as seen in FIG. 5.

As seen in FIG. 1, an annular resilient locking ring 41 is provided of a diameter adapted to pass over nose 23 of bolt 11 and snap-fit into groove 24. The nose 23 of bolt 11 may have a terminal tapered end 42 (FIG. 2) leading therein to facilitate assembly of ring 41 and guide the nose 23 of bolt 11 into the countersunk opening 30 through panel 22.

Also seen in FIG. 1 is a restraining member in the preferred form of a resilient annular O-ring 150 which is adapted to snap fit into an annular groove 151 machined or otherwise formed on the inner surface 152 (FIGS. 2 and 3) of bolt 11 so that the groove 151 is only exposed on the exterior of bolt 11 where groove 151 intersects grooves 35 through 37 (see FIG. 1). A counterbore 154 is provided on the blind or interior side 155 of panel 22 for receiving ring 34 therein. A flat plate 156 is riveted, via rivets 157, or otherwise secured to the side 155 of panel 22. As seen in FIG. 2, plate 156 extends from hole 158 through panel 22 to a gasket 50 provided between panel 22 and sub-panel 20, as will be discussed further hereinbelow. Thus, as seen in FIG. 2, the ring 34 is trapped between the plate 156 and the panel 22 in counterbore 154.

The assembly of the elements of FIG. 1 will now be described. After formation of openings 30 and 31 through panel 22 and sub-panel 20, respectively, the receptacle assembly 12 is secured to the underside of sub-panel 20 by riveting basket 13 to panel 20 by rivets 21 passing through holes 44 (FIG. 1) in basket 13 and into sub-panel 20. The barrel 14 and stud 15 are secured thereto as heretofore described. One or more inwardly facing protrusions 43 may be provided on the exterior of barrel 14. These protrusions 43 provide a friction lock between the internal surface of barrel 14 and the exterior of bolt 11. Of course, any suitable thread lock as is known in the art may be used, such as a plastic insert installed through the side of barrel 14 or protrusions on the threads of the bolt.

Bolt 11 is now inserted through countersunk opening 30 and through hole 158. Ring 150 is snap fit into groove 151 and ring 34 is mounted to bolt 11 with ears 38 to 40 entering grooves 35 through 37, respectively (FIG. 6). Retaining ring 41 is snap fitted over nose 23 and into groove 24 as heretofore described. Thus, ring 34 cannot move off of bolt 11 because of its engagement with ring 41 (ears 38 to 40 abutting against ring 41 in its downwardly movement—see FIG. 3) nor move up past enlarged head 29. Plate 156 is installed on panel 22. Thus, bolt 11 is trapped in opening 30 in panel 22 with ring 34 trapped between plate 156 and panel 22 in counterbore 154.

Sub-panel 20 may now be brought into position abutting against panel 22 and bolt 11 may be threaded to stud 15 on the receptacle assembly 12. Thus, sub-panel 20 is releasably secured to panel 22. The ring 34 rides in grooves 35 to 37 up and down over the differing diameter sections of bolt 11 as heretofore described.

As seen in FIG. 3, the flat washer or ring 34 is shown disposed within grooves 35 to 37 above ring 150. Ring 34 slides over resilient ring 150 (FIG. 8) and stops against the retaining ring 41. This is the position shown in FIG. 2. In this manner, the bolt 11 remains in the up or extracted position shown in FIG. 2 while the panel 22 may be either abutting against panel 20, as shown in FIG. 2, or moved away therefrom, or bolt 11 may even be mounted in panel 22 prior to connection to the aircraft or other installation in which the panel 22 is mounted. The washer or annular ring 34 remains trapped between rings 150 and 41, as seen in FIG. 2, not only holding bolt 11 in the hold out position, but ensuring it can't move back inwardly.

Figure 9:
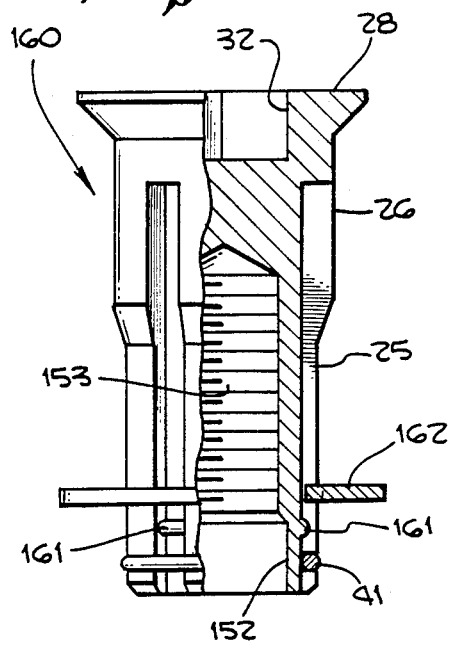
FIG. 9 is a view similar to FIG. 3 showing a modification of the bolt and retainer thereof.
Figure 11:
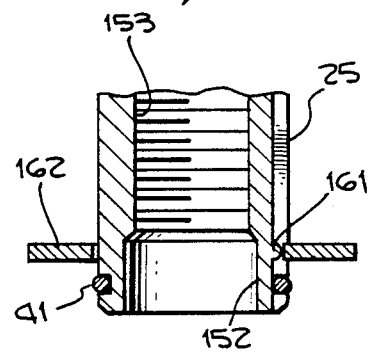
FIGS. 11 and 12 are views similar to FIGS. 8 and 2, respectively, showing two steps in the functioning of the apparatus of FIG. 9.
Figure 10:
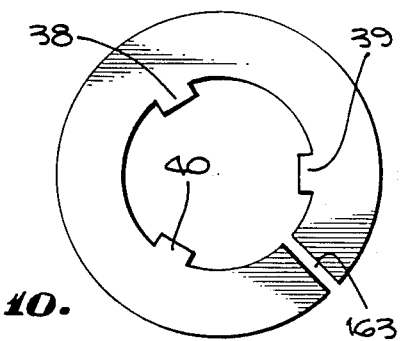
FIG. 10 is a perspective view of a modified retaining ring used on the bolt of FIG. 9.

As seen in FIG. 9, a modified bolt 160 is shown otherwise similar to bolt 11 of FIGS. 1 to 8 and like numerals refer to like parts thereof. Bolt 160 is mounted to back plate 156 and panel 22 of FIG. 2 in like manner. However, in this embodiment of the invention, ring 150 and groove 151 have been eliminated in favor of restraining means in the form of bumps or protuberances 161 on the outer surface of the slots 35 to 37 of lower portion 25 of bolt 160. As seen in FIG. 10, retaining ring 34 has been replaced by a retaining ring 162 having a slot 163 which allows ring 162 to expand and contract as it moves over the bumps 161 in the slots 35 to 37. As the retaining ring 162 moves over the bumps 161 (FIG. 11) and stops against the retaining ring 41 (FIG. 12), the slot 163 opens wider than shown in FIG. 10, then closes back to the FIG. 10 position, and ring 162 remains trapped between back plate 156 and panel 22 as seen in FIG. 12.

Figure 12:
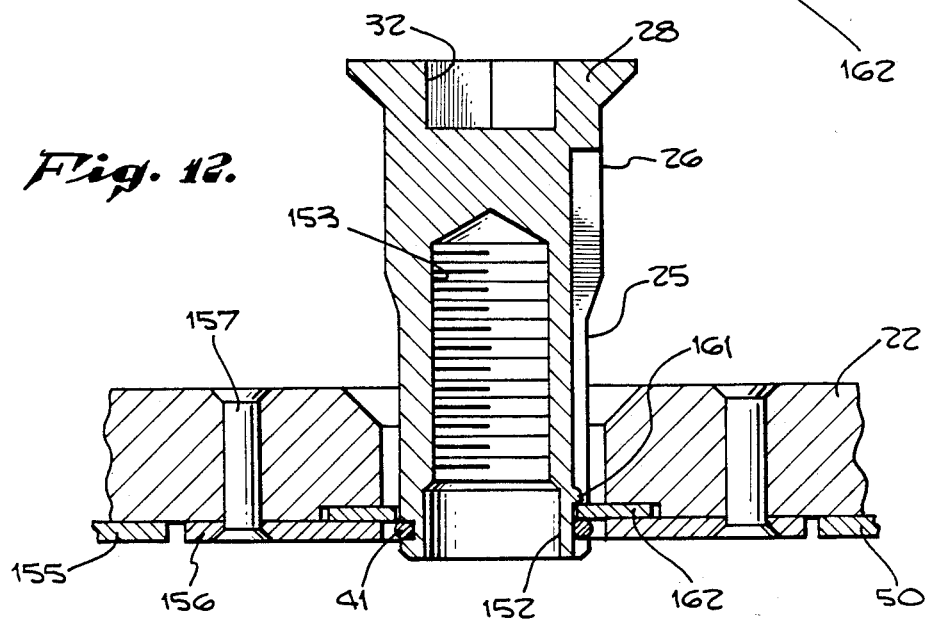

The final view of bolt 160 in FIG. 12 conforms to the view of the bolt 11 shown in FIG. 2.

Still another modification of bolt 11 is shown in FIGS. 13 through 16. In this embodiment, wherein again like numerals refer to like parts of the bolt of FIGS. 1 to 8, bolt 164 is shown having slots 35 to 37 (only slot 35 visible in FIG. 13). Restraining means is provided including an annular groove 165 formed on the outer surface of the lower portion 25 of bolt 164 passing through slots 35 to 37. The lower end of each slot 35 to 37 adjacent nose 42 is wider to form an enlarged area 166, which may be square-shaped as shown. It can be seen that area 166 is situated so that slot 35 (and, of course, slots 36 and 37) passes therethrough with groove 165 passing along the top thereof.

As seen in FIG. 14, the restraining means further includes a retaining member 167 having a main top portion 168 with a plurality of spaced downwardly extending generally U-shaped loops 169 to 171. Three such loops 169 to 171 are provided corresponding, in spacing therebetween, to the spacing between grooves 35 to 37. Also, the distance between the upper surface of portion 168 and the lower terminal end of loops 169 to 171 is generally related to the distance between groove 165 and the bottom of area 166 (see FIG. 13). The spacing between the lateral extremities of each loop 169 to 171 is generally related to the width of each area 166. Member 167 may be of wire or other suitable material and snap fits into groove 165, as seen in FIG. 13, with loops 169 to 171 entering the area 166 associated with each groove 35 to 37. In this embodiment, the stop ring 41 has been eliminated and its function taken up by member 167.

In operation, ring 34 (FIG. 13) moves down bolt 164 within slots 35 to 37 as heretofore discussed, ears 38 to 40 entering each loop 169 to 171 (as loop 169 in FIG. 13), as seen in FIG. 15, and is stopped or retained therein by engagement with the bottom of each loop 169 to 171, as seen in FIG. 16. Thus, member 167 traps ring 34 in place, as seen in FIG. 16, between plate 156 and panel 22, as heretofore discussed with respect to FIG. 2, and also prevents or arrests upward movement by engagement of ring 34 with member 167 (see FIG. 15). That is, the width of each ear 38 to 40 is slightly larger than the spacing between portions 175, 176, as shown in FIG. 15, which are resilient and spread apart when ring 34 is forced upwardly thereagainst. Ring ears 38 to 40 are also slightly smaller than the spacing in the U-shaped area of each loop 169 to 171.

In all embodiments, the bolt can remain in the upper or extracted position shown in FIG. 2 while the panel 22 is being attached to the installation or otherwise held so attached thereto. In all embodiments, the ring 34 is trapped between the plate 156 and the panel 22 in counterbore 54. The plate 156 is installed by the ultimate user after insertion of the bolt in panel 22.

The bolt assembly described herein can be used for conventional size diameter holes in aircraft panels. The bolt 11 has a tapered shank so that, as soon as it is withdrawn from the panel hole, there is no load bearing on the shank area of lesser outer diameter than the upper shank area. Thus, the tabs 38 to 40 of ring 34 and the grooves 35 to 37 of bolt 11 serve to maintain the advantages of known fasteners, such as the Harbison et al. fastener described and claimed in U.S. Pat. No. 2,991,816, while eliminating binding that might occur between the spring and bolt body of such prior art fasteners. Further, the ring 34 is a solid metallic ring and will not wear and lose its resiliency as might the spring 44 of the prior art Harbison et al. fastener. Since the ring 34 disclosed herein does not have to expand and contract as it moves along the differing diameter sections of the bolt body, it is not subject to fatigue as is the Harbison et al. fastener. Applicant's ring 34 is easier to manufacture and less expensive than the spring device 44 of Harbison et al. Thus, applicant's ring 34 will not come off, due to the retainer ring 41 in groove 24, whereas the Harbison et al.'s spring 44 might fatigue and come off resulting in loss thereof and, possibly, sucking of the same into the engine aircraft resulting in considerable damage. Of course, once the spring 44 of Harbison et al. is lost, the bolt itself may also shake loose and fall out of the panel in which it is installed.

Thus, rotation of the sleeve bolt 11 will cause it to threadably engage stud 15 of the receptacle assembly 12. Preferably, bolt 11 and stud 15 are provided with double lead threads in order to decrease the time and motion required to remove and install the panel. In some applications, the thickness of panel 22 and sealing requirements may necessitate the use of gasket 50 (FIG. 2), preferably the same thickness as ring 34, between the panel 22 and sub-panel 20. Alternatively, the gasket 50 can be eliminated. Also ring 34 may be disposed in a counterbore formed in the upper surface of sub-panel 20, if desired.

It can be seen that I have described a quick action fastener having a bolt which, when freed from engagement with the stud, is retained to the access panel. The bolt can remain in the up or extracted position while the panels are being attached to the installation, such as an aircraft. The parts are simple and easy to install. The ring 34 and ring 162 may be quickly and easily stamped out of a metal stamping forming ears 38 through 40. Thus, no careful machining of these parts is necessary.

Although a specific receptacle assembly has been described, any suitable receptacle assembly may be used.

Although I have described the fastener assembly with reference to certain preferred embodiments, it is to be understood that the appended claims describe the scope of the invention and various changes and modifications may occur to one skilled in the art without departing from the scope of the invention.

I claim:

1. In a fastener assembly for joining a panel to a sub-panel comprising a receptacle assembly having a threaded stud secured to the undersurface of the sub-panel, a bolt having an enlarged head at one end and a nose at the other end, said nose being adapted to extend through a countersunk opening in said panel coaxially aligned with an opening in said sub-panel with the stud of said receptacle assembly coaxially aligned with the both of said openings, said bolt being internally threaded for threaded engagement to said stud, the improvement which comprises:

a retainer having indexing means extending inwardly toward the central longitudinal axis thereof;

said bolt having guide means extending longitudinally along the outer surface thereof receiving therein said indexing means for guiding said retainer along the body of said bolt;

a plate secured to the underside of said panel trapping said retainer between the panel and said plate; and restraining means associated with said bolt comprising two discrete elements on said bolt separated by a relatively smooth outer surface portion of said bolt guide means, one of said elements positively arresting the downward movement of said retainer indexing means along said guide means and the other of said elements disposed in the path of movement of said retainer indexing means and yieldably engagable thereby for impeding the upward movement of said retainer along said guide means upon positive engagement between said retainer and said last-mentioned element thereby retaining said bolt of said panel in an up or extracted position when said bolt is disengaged from said stud.

2. In the assembly of claim 1 wherein said retainer is an annular ring having a plurality of inwardly extending spaced ears.

3. In the assembly of claim 2 wherein said guide means comprise a plurality of longitudinally extending spaced grooves extending along the outer surface of said bolt, said ears extending into respective ones of said grooves.

4. In the assembly of claim 1 wherein said one of said elements is a stop ring mounted in a groove adjacent the nose of said bolt and said guide means comprises a plurality of longitudinally extending spaced grooves extending along the outer surface of said bolt and through said groove adjacent the nose of said bolt.

5. In the assembly of claim 1 wherein said retainer is a flat metallic annular ring member having a plurality of spaced inwardly extending ears lying in the same horizontal plane as the remainder of said annular ring member.

6. In the assembly of claim 1 wherein one of said discrete elements of said restraining means includes a ring snap-fitted into a groove adjacent the nose of said bolt and the other of said discrete elements is a resilient ring snap-fitted into a groove spaced from said first-mentioned groove, said retainer being adapted to pass over said resilient ring and abut against said first-mentioned ring and encircle said smooth outer surface portion when said bolt is moved to the up or extracted position.

7. In the assembly of claim 6 wherein said bolt is internally threaded and said groove of said resilient ring is formed on the interior of said bolt below the threaded portion thereof, said last mentioned groove being exposed on the exterior of said bolt only where said groove intersects said guide means.

8. In the assembly of claim 7 wherein said guide means are a plurality of spaced slots on the exterior of said bolt.

9. In a fastener assembly for joining a panel to a sub-panel comprising a receptacle assembly having a threaded stud secured to the undersurface of the sub-panel, a bolt having an enlarged head at one end and a nose at the other end, said nose being adapted to extend through a countersunk opening in said panel coaxially aligned with an opening in said sub-panel with the stud of said receptacle assembly coaxially aligned with both of said openings, said bolt being threaded for threaded engagement to said stud, the improvement which comprises:
 a retainer having indexing means extending inwardly toward the central longitudinal axis thereof;
 said bolt having guide means extending longitudinally along the outer surface thereof receiving therein said indexing means for guiding said retainer along the body of said bolt;
 a plate secured to the underside of said panel trapping said retainer between the panel and said plate; and
 restraining means associated with said bolt for arresting the downward movement of said retainer along said guide means and for impeding the upward movement of said retainer along said guide means thereby retaining said bolt of said panel in an up or extracted position when said bolt is disengaged from said stud said restraining means including a ring snap-fitting into a groove adjacent the nose of said bolt and a resilient ring snap-fitting into a groove spaced from said first-mentioned groove, said retainer being adapted to pass over said resilient ring and abut against said first-mentioned ring when said bolt is moved to the up or extracted position.

10. In the assembly of claim 9 wherein said bolt is internally threaded and said groove of said resilient ring is formed on the interior of said bolt below the threaded portion thereof, said last-mentioned groove being exposed on the exterior of said bolt only where said groove intersects said guide means.

11. In the assembly of claim 10 wherein said guide means are a plurality of spaced slots on the exterior of said bolt.

12. In a fastener assembly for joining a panel to a sub-panel comprising a receptacle assembly having a threaded stud secured to the undersurface of the sub-panel, a bolt having an enlarged head at one end and a nose at the other end, said nose being adapted to extend through a countersunk opening in said panel coaxially aligned with an opening in said sub-panel with the stud of said receptacle assembly coaxially aligned with the both of said openings, said bolt being threaded for threaded engagement to said stud, the improvement which comprises:
 a retainer having indexing means extending inwardly toward the central longitudinal axis thereof;
 said bolt having guide means extending longitudinally along the outer surface thereof receiving therein said indexing means for guiding said retainer along the body of said bolt;
 a plate secured to the underside of said panel trapping said retainer between the panel and said plate; and
 restraining means associated with said bolt comprising two discrete elements on said bolt separated by a relatively smooth outer surface portion of said bolt for arresting the downward movement of said retainer along said guide means and for impeding the upward movement of said retainer along said guide means thereby retaining said bolt of said panel in an up or extracted position when said bolt is disengaged from said stud, said restraining means including a ring snap-fitted into a groove adjacent the nose of said bolt and the other of said discrete elements being a resilient ring snap-fitted into a groove spaced from said first-mentioned groove, said retainer being adapted to pass over said resilient ring and abut against said first-mentioned ring and encircle said smooth outer surface portion when said bolt is moved to the up or extracted position.

13. In the assembly of claim 12 wherein said bolt is internally threaded and said groove of said resilient ring is formed on the interior of said bolt below the threaded portion thereof, said last-mentioned groove being exposed on the exterior of said bolt only where said groove intersects said guide means.

14. In the assembly of claim 12 wherein said guide means are a plurality of spaced slots on the exterior of said bolt.

* * * * *